United States Patent Office.

PIERRE MANHES, OF LYONS, FRANCE, ASSIGNOR OF ONE-HALF TO THE SOCIÉTÉ ANONYME DE MÉTALLURGIE DU CUIVRE, PROCÉDÉS PRE. MANHES, OF SAME PLACE.

PROCESS OF TREATING NICKEL.

SPECIFICATION forming part of Letters Patent No. 586,289, dated July 13, 1897.

Application filed April 25, 1894. Serial No. 508,984. (No specimens.) Patented in France January 16, 1894, No. 235,597; in Germany March 2, 1894, No. 80,467, and in England April 7, 1894, No. 6,984.

*To all whom it may concern:*

Be it known that I, PIERRE MANHES, metallurgical engineer, a citizen of the Republic of France, residing at 3 Rue Sala, Lyons, in the Republic of France, have invented certain new and useful Improvements Relating to the Treatment of Nickel and Cobalt Ores, (for which I have obtained Letters Patent in France, No. 235,597, bearing date January 16, 1894; in Great Britain, No. 6,984, bearing date April 7, 1894, and in Germany, No. 80,467, bearing date March 2, 1894,) of which the following is a specification.

My invention relates to the treatment of nickel and cobalt ores. The improved process for the treatment of these ores is based, in part at least, upon the reactions already described in the specification of a former application, filed on April 23, 1894, under Serial No. 508,701, in which case, however, the process is designed for the purpose of desulfurizing a nickel-matte or sulfid of nickel previously almost altogether freed from iron by any known process. The present application, however, constitutes an absolutely new and altogether distinct industrial process in this sense, that instead of taking place in several successive operations it enables the treatment of nickel and cobalt ores and the production of these commercially-pure metals to be effected in a single operation, and is therefore a very important improvement from an economical point of view.

This process is based upon two principal reactions, which are, first, the elimination of the iron by the oxidation of this metal and the dissolution of the oxid of iron formed in special basic or alkaline fluxes, which cause it to pass in the state of fluid scoria or dross at a sufficiently high temperature. These fluxes are the various salts of soda, potash, aluminium, the borates, and the like. In practice I prefer to employ natural borate of lime or boracite; but it will be clearly understood that use may be made of any basic or alkaline substance susceptible of dissolving oxid of iron and forming with it, at a high temperature, a fluid scoria; second, the elimination of the sulfur by the employment of certain special reagents, likewise basic or alkaline, mixed with chlorids of the same nature—such as lime, baryta, magnesia, soda, potash—to which are added chlorids of calcium, lime, barium, magnesium, sodium, potassium, and the like. In practice I employ by preference a mixture of lime and chlorid of lime.

I operate upon the matte produced by the rough fusion of the ore, which matte is formed either by the sulfur contained in the ore itself or by the sulfur added by means of sulfurating materials in the case of oxidized ores. It should here be observed that in the case of oxidized ores I may apply my process to the treatment of the product from the rough fusion of these ores without previous sulfuration, the product of this first fusion of the ore being in this case not a matte, but molten mass of nickel and iron—that is to say, a mixture of metallic nickel and iron more or less carburated. In fact, in the treatment of this molten mass the reactions to be obtained are the same as for the treatment of the matte, with this sole difference, that I have not to employ the reagents designed for the elimination of the sulfur, but only those designed for the elimination of the iron.

The treatment of the matte or of the molten mass is effected in the well-known apparatus called in metallurgy by the name of "converter." I may employ either the ordinary Bessemer converter or a fixed or movable converter of any other kind, but prefer to use the movable converter known by the name of "Manhes" converter and employed in the metallurgy of copper.

For the sake of simplicity I will hereinafter refer only to nickel, it being expressly understood that the whole applies also to the treatment of cobalt ores.

Having thus explained the principles upon which my invention is based, I will now summarily describe a metallurgical operation, taking as an example the treatment of a matte produced by the fusion of a naturally sulfurous or artificially sulfurated ore, which matte contains as its chief constituents iron, sulfur, and nickel. I suppose the operation to take place in a Manhes converter, the lining of which, as already stated, must be made of basic materials, such as lime, magnesia, dolomite, or the like, for an acid lining would not resist the action of the fluxes employed and would not permit of the necessary reactions being obtained.

The molten matte is passed directly from the melting-furnace into the converter, and when the latter has received its charge of matte I commence the blowing, which rapidly raises the temperature. A portion of the sulfur is eliminated in the state of sulfurous acid, while the iron is rapidly oxidized; but under the energetic oxidizing action produced by the passage of air into the mass in fusion the oxid of iron formed would be almost immediately transformed into peroxid, which would remain in the solid or pasty state despite the high temperature and then be projected—that is to say, thrown out of the converter by the force of the air—constituting a danger to workmen and rendering the continuation of the operation impossible. It is then that the special reagents or fluxes intervene to which I have before referred and which have for their object to dissolve the oxid of iron in proportion as it is produced and to keep it in the state of fluid scoria or dross. For this purpose the said reagents have been added in the converter after the introduction of the matte and before the commencement of the blowing. It has already been stated that in practice I preferably employ natural borate of lime or boracite, but that I may also use any other substance capable of producing a similar reaction. When the iron has been almost totally oxidized, which it is easy to recognize by the appearance of the flame, I stop the blowing and let out the scoria produced. Then I add the second series of reagents—that is to say, those designed for the elimination of the sulfur, by preference in practice the mixture of lime and chlorid of lime—whereupon the blowing is recommenced. The remaining sulfur combines very rapidly and with these reagents to form alkaline or basic sulfids, and there remains finally in the converter commercially pure nickel, which in its turn is run into suitable ingot-molds.

If in lieu of a sulfurous matte I treat molten nickel which still contains much iron but scarcely any sulfur, the operation is the same except that it is stopped at the moment when the scoria produced by the dissolution of the oxid of iron has been run out, for at this moment there remains only commercially pure nickel in the converter.

It is almost impossible to represent by chemical formula the reactions which take place in this process, for that would presuppose precise proportions of the reagents employed, and such is not the case. In fact these proportions vary according to the nature and the composition of the material treated. As an example applicable to the treatment of the material for the elimination of iron the action may be represented: $Ni_2S + FeS + O_3 = FeO + SO_2 + Ni_2S$. One has thus as the product a subsulfuret of nickel, $(Ni_2S,)$ the sulfur of which may be eliminated as follows, (formula as an example only:) $4Ni_2S + CaO + CaCl + O = 2CaS + SO_2 + SCl + Ni_8$.

The formulæ given above are mere examples, as in actual operation the workman who conducts it adds the reagents in small quantities. He follows up the operation by taking samples and stops the operation when the purification of the metal has reached the desired point.

Having thus described my invention, what I claim, and desire to secure by Letters Patent, is—

1. The herein-described process of treating nickel and cobalt ores containing iron and sulfur, said process consisting in adding thereto an alkaline or basic reagent or flux; heating the ore and added flux in the presence of an oxidizing-flame until the contained iron is oxidized and the oxid of iron combines with the reagent or flux to form a fluid scoria; adding to the molten metal a second series of alkaline or basic reagents with which is mixed a chlorid of the same nature, and continuing the heating process until the sulfurous impurities combine with the reagents to form an alkaline or basic sulfid leaving the nickel in a commercially pure condition.

2. The herein-described process of treating molten nickel ores containing iron and sulfur, said process consisting in first, placing in a converter or similar apparatus a quantity of molten nickel-matte; second, adding thereto an alkaline or basic reagent or flux; third, heating the nickel-matte and the added flux in the presence of an oxidizing-flame until the contained iron is oxidized and the oxid of iron is dissolved and combines with the reagent or flux to form a fluid scoria, fourth, removing the fluid scoria so produced; fifth, adding to the molten nickel-matte a second series of alkaline or basic reagents to which is added a chlorid of the same nature, continuing the heating process until the sulfurous impurities are combined with the reagents to form an alkaline or basic sulfid and leaving the nickel in a commercially pure condition.

3. The herein-described process of treating nickel ores containing iron and sulfur, said process consisting in adding to molten nickel-matte a borate of lime and heating the mixture in the presence of an oxidizing-flame until the iron combines with the borate of lime to form a fluid scoria, removing the fluid scoria and adding to the remaining nickel-matte a mixture of lime and chlorid of lime and continuing the heating until the sulfur contained in the nickel is combined with the lime and chlorid of lime to form a sulfid of lime, substantially as specified.

4. The herein-described process of treating molten nickel ores containing iron and sulfur, said process consisting in first, placing in a converter or similar apparatus a quantity of molten nickel-matte; second, adding thereto a quantity of borate of lime; third, heating the nickel-matte and borate of lime in the presence of an oxidizing-flame until the iron is oxidized and the oxid of iron is dissolved and combines with the borate of lime to form a fluid scoria; fourth, removing the fluid scoria so produced; fifth, adding to the molten nickel-matte a quantity of lime mixed with chlorid of lime, continuing the heating process until the sulfur combines with the lime and chlorid of lime to form a sulfid of lime and leaving the nickel in a commercially pure condition.

In witness whereof I have hereunto set my hand this 4th day of April, 1894.

PIERRE MANHES.

Witnesses:
   NAISER JANIROT,
   JEAN GERMAIN.